Patented July 25, 1950

2,516,729

UNITED STATES PATENT OFFICE 2,516,729

POLYCARBONYLIC COMPOUNDS AND PREPARATION OF THE SAME

Curtis W. Smith, Berkeley, Calif., assignor to Shell Development Company, San Francisco, Calif., a corporation of Delaware No Drawing. Application February 18, 1947, Serial No. 729,408

13 Claims. (Cl. 260—586)

1

This invention relates to chemical compounds containing a plurality of ketonic carbonyl groups and to a method for their preparation. More particularly, the present invention relates to certain acyclic and to certain alicyclic compounds containing a plurality of ketonic carbonyl groups. The invention also relates to a method of producing polycarbonylic compounds such as the foregoing and others, which comprises the step of condensing an alpha,beta-unsaturated aldehyde with a diketone.

The process of the present invention comprises essentially reacting an unsaturated aldehyde, such as an alpha,beta-olefinically unsaturated aldehyde, with a diketone in which the two carbonyl carbon atoms are separated by at least one carbon atom, and wherein there is present at least one hydrogen atom attached to a carbon atom that is directly bonded to a carbonyl carbon atom. The condensation reaction preferably is effected in the presence of a catalyst, although the use of an added catalyst is not always essential. The reaction may be effected by mixing the two reactants at a suitable temperature and allowing the mixture to remain under conditions which favor the desired reaction, for a time sufficient for appreciable condensation reaction to occur. Thereafter, the reaction mixture may be treated, for example by fractional distillation, so as to recover the products of reaction and any excess or unreacted reactants that may be present.

The mechanism of the reaction in the present instance appears to be complex. It has been found that a plurality of useful and valuable products may be prepared from any given combination of reactants of the present class. In certain instances, such a plurality of products is formed simultaneously, in relative amounts that may be determined at least in part by the particular reaction conditions that are employed. In other instances it has been found that the formation of certain of the products may be favored preferentially by suitable selection of the conditions of reaction. Although diverse in respect to certain aspects of their chemical structure, the compounds that are provided by the present invention possess in common the characteristics of containing at least two ketonic carbonyl groups, and of containing at least one pair of ketonic carbonyl groups the carbon atoms of which are joined together by one intervening carbon atom.

The unsaturated aldehydes that are employed in the process of the present invention are the alpha,beta-unsaturated aldehydes, i. e., those unsaturated aldehydes that contain at least one carbon-to-carbon multiple bond and that have a carbon-to-carbon multiple bond connecting two carbon atoms one of which is directly attached to the carbon atom of the formyl group. Representative alpha-beta-unsaturated aldehydes include, for example, acrolein, methacrolein, crotonaldehyde, alpha - methylcrotonaldehyde, alpha,-beta-diethylcrotonaldehyde, cinnamic aldehyde, alpha-chloroacrolein, citral, propargylic aldehyde, beta-cyclohexylacrolein, 2,4-pentadien-1-al, beta-ethoxyacrolein, alpha - phenylacrolein, 1 - cyclohexene - 1 - carboxaldehyde, glutaconaldehyde, gamma-carbethoxycrotonaldehyde, gamma-(p-chlorophenyl)-crotonaldehyde, and their homologs and their analogs.

Although a wide variety of alpha,beta-unsaturated aldehydes may be employed in accordance with the present invention, a preferred class of unsaturated aldehydes is represented by acrolein and its homologs, a homolog of acrolein being defined for purposes of the present invention as an alpha,beta-olefinically unsaturated aldehyde that has an empirical formula differing from the empirical formula of acrolein by CH₂ or an integral multiple thereof. Acrolein and its homologs may be represented generically by the structural formula

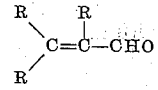

in which each R represents either the hydrogen atom or an open-chain alkyl group such as a methyl, ethyl, propyl, isopropyl, tertiary-butyl, pentyl, or a homologous group. Acrolein, the lowest member of this homologous series, is particularly suited to the preparation of useful compounds according to the present process. Crotonaldehyde and methacrolein, because of their reactivity and their availability, also are highly suited to utilization in accordance with the process of the invention.

The diketone that is caused to react with the unsaturated aldehyde in accordance with the present invention may be either cyclic or acyclic, saturated or unsaturated, aromatic or non-aromatic. It must have at least one hydrogen atom in the alpha position in respect to a carbonyl group, that is, attached to a non-aromatic carbon atom which in turn is directly bonded to a carbonyl carbon atom. A preferred class of diketones comprises the beta-diketones wherein the two carbonyl carbon atoms are separated by one carbon atom to which both carbonyl carbon atoms and at least one hydrogen atom are bonded.

These preferred diketones may be represented as containing the structural unit

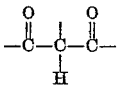

which may be either part of an open chain group of atoms or may form part of a ring structure such as an alicyclic ring. Among the numerous diketones within this preferred class may be mentioned, for example, acetylacetone (2,4-pentanedione), 2,4-hexanedione, 1,3-cyclohexanedione, 1 - phenyl - 2,4 - pentanedione, 2,6-dimethyl-3,5-heptanedione, 6-methyl-1-heptene-3,5-dione, 1,6-heptadiene-3,5-dione, 5-cyclohexene-1,3-dione, 2-acetyl - 1-cyclohexanone, 2 - acetyl-5-cyclohexen-1 - one, 2,4,6 - trimethyl - 3,5 - heptanedione, and compounds homologous and/or analogous to those specifically mentioned. As will be illustrated hereinafter, certain of the novel compounds that may be prepared by the process of the present invention may be employed as the dicarbonylic reactant if desired. It frequently is desirable and particularly convenient to employ acetyl-acetone or a homologous, preferably symmetrical, compound wherein the two carbonyl carbon atoms are joined together by a methylene group and the carbonyl carbon atoms are directly linked only to secondary aliphatic carbon atoms, e. g., compounds having structures represented by the formula

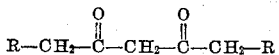

in which R signifies either the hydrogen atom or an open-chain alkyl group such as methyl, ethyl and the straight-chain or branched-chain homologs thereof. Useful products of condensation reaction may be prepared when any of the foregoing diketone compounds is employed as the ketonic reactant. However, the diketones represented by the immediately foregoing structural formula have the particular advantage of tending to form by reaction with an unsaturated aldehyde in the present process, cyclic products that are of particular value in various applications. Such diketones therefore constitute a preferred class within the more general disclosures contemplated as within the invention.

The process of the present invention may be executed by mixing the two reactants in suitable proportions and allowing the mixture to stand at a suitable temperature until the reaction has proceeded to the desired extent. If desired, the reaction may be accelerated by the use of moderately elevated temperatures and/or a catalyst that is effective in increasing the reaction rate.

The aldehydic and the ketonic reactants may be employed in such proportions that either one may be present in excess. Molar ratios between the two reactants of from 20:1 to 1:20 constitute a suitable range of proportions. Either larger or smaller ratios may be employed, if desired, although ordinarily no particular advantage is to be gained from the use of greater excesses of either reactant. Within this more general range of proportions, certain more limited, preferred ranges exist. It has been found, for example, that acrolein and its homologs and acetyl-acetone and its homologs corresponding to the last given structural formula, may be caused to react to form products which contain carbon atoms derived from molecules of the respective reactants in ratios which depend at least in part upon the particular reaction conditions employed. The two reactants may be caused to interact in molecular ratios which may differ according to the particular circumstances involved. For example, the reaction in the present process of these unsaturated aldehydes and diketones present in amounts corresponding to not more than about 1.5 moles of aldehyde per mole of the diketone has been found to favor the formation of products resulting from the interaction of one molecule of diketone with one molecule of unsaturated aldehyde. The presence of larger relative amounts of unsaturated aldehyde, preferably from about 2 to about 10 moles of the aldehyde per mole of the diketone, has been found to favor the formation of products resulting from the reaction of two molecules of the aldehyde with one molecule of the diketone. The presence of a relative excess of the diketone, say in excess of 2 moles of the diketone per mole of the unsaturated aldehyde, may favor reaction to form products containing carbon atoms derived from two molecules of the diketone and one molecule of the unsaturated aldehyde.

If the reactants are mutually soluble, or miscible, the reaction therebetween may be effected by mixing the reactants in the selected proportions in the absence of an added solvent. If it is desired to dilute the reaction mixture, or to render miscible an otherwise immiscible mixture of reactants, an inert mutual solvent may be included in the reaction mixture. Either or both of the reactants thus may be dissolved in a solvent therefor and added to the other or, in the alternative, the solvent may be added separately to the reaction mixture at any time during the reaction. Any of the customary organic solvents may be employed provided it is inert with respect to the reactants and the reaction products. Solvents which may be employed include, for example, the saturated and the aromatic hydrocarbons, ethers, halogenated hydrocarbons, and the like.

The presence of substances having catalytic activity is not a prerequisite to the successful execution of the process. However, it has been found that the presence of a catalyst desirably accelerates the reaction and also permits the use of lower temperatures of reaction than otherwise might be possible. Basic substances, or substances having basic characteristics are, in general, effective in catalyzing the present reaction. Pyridine is a preferred catalyst. Other materials which may be employed as catalysts include, for example, such basic materials as diamylamine, diethylamine, sodium ethoxide, potassium phenoxide, and similar materials that preferably are organic in character and that are sufficiently soluble in the reaction mixture. Gaseous substances that are soluble in the reaction mixture, such as sulfur dioxide, trimethylamine and the like, also may be employed as catalysts for the reaction. Amounts of catalyst from a mere trace up to 15 per cent or more by weight of the reaction mixture may be employed, a preferred amount in the case of pyridine, for example, being from about 0.5 to about 10 per cent by weight of the reaction mixture.

The temperature at which the reaction is effected is not highly critical and may be varied over relatively wide limits. Temperatures sufficiently high to promote excessive decomposition, polymerization, or other undesired changes in either the reactants or the desired products of reaction, desirably are avoided. Tempetratures of from about 0° C. to about 100° C. are generally satisfactory. A preferred range, which is particularly satisfactory when a catalyst such as pyridine is employed, is from about 10° C. to about 50° C. In the absence of a catalyst the relatively more elevated temperatures are, in general, desirable. The reaction is exothermic. In some cases it therefore may be desirable to provide suitable means such as cooling coils to maintain the temperature of the reaction mixture within reasonable limits. Because of the exothermic nature of the reaction, relatively low temperatures are advantageous during at least the initial stages of the reaction, thereby providing better control of the rate of reaction, etc. More elevated temperatures may be employed during the later stages of the reaction, if desired, to accelerate the reaction during its final stages. A preferred manner of executing the process of the present invention comprises mixing the two reactants in the selected proportions, and adding an effective amount of the catalyst to the mixture while maintaining the temperature of the mixture within a suitable range such as from about 10° C. to about 50° C. In the case of reactants that are less reactive than, for example, acrolein and acetylacetone, higher temperatures frequently may be employed advantageously. The time of reaction will depend upon the other conditions of the reaction and upon the particular reactants that are involved. Reaction times of from 0.5 to 24 hours or more thus may be utilized. The reaction may be carried out in either a batchwise or continuous manner. After completion of the reaction, the products formed thereby may be recovered from the reaction mixture in any suitable manner, such as by treatment with selective solvents, by fractional distillation, by crystallization in appropriate cases, and by similar means.

Among the useful products that may be prepared by the process of the present invention are aliphatic saturated carbonyl compounds which have structures corresponding to the apparent structural formula

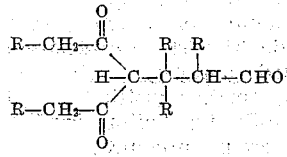

in which each R represents either the hydrogen atom or a straight-chain or branched-chain alkyl group. Compounds corresponding to this formula may be prepared most advantageously by reacting according to the present process an aliphatic alpha,beta-unsaturated aldehyde, specifically acrolein or one of its homologs, with a beta-diketone, such as acetylacetone or one of its homologs, presents in substantially equimolar quantities, say in molar ratios between about 2:1 and 1:2. Compounds corresponding to this formula are preferably represented by the specific compound gamma,gamma-diacetylbutyraldehyde, which may be prepared from acrolein and acetylacetone. Other compounds corresponding to this formula and which are included within the broader aspects of the invention include, for example, gamma,gamma - diacetyl - beta - methylbutyraldehyde, gamma,gamma-dipropionylbutyraldehyde, gamma-acetyl-gamma-propionyl-alpha-methylbutyraldehyde, gamma,gamma-dibutyryl-alpha-methyl-beta-ethylbutyraldehyde, gamma-acetyl-gamma - propionyl - beta,beta - diethyl - alpha-methylbutyraldehyde and homologous and analogous compounds.

A further group of compounds that may be prepared according to the present process comprises alicyclic dicarbonyl compounds having structures that may be represented by the apparent structural formula

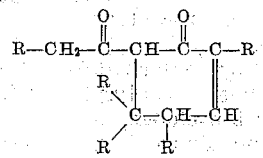

in which each R represents either the hydrogen atom or a straight chain or branched chain alkyl group. Compounds corresponding to this generic formula in structure frequently may be prepared simultaneously and under the same conditions of reaction with the gamma,gamma-diacylaldehydes represented by the preceding structural formula. Because of its particular chemical characteristics, the specific compound 2-acetyl-5-cyclohexen-1-one is a preferred member of this group of compounds. Other compounds corresponding in structure to the foregoing structural formula comprise, for example, 2-acetyl-4-methyl-5-cyclohexen-1-one, 2 - acetyl - 3,4,6-trimethyl-5-cyclohexen-1-one, 2-acetyl-3,4,-dimethyl-6-ethyl-5-cyclohexen-1-one, 2-propionyl-3,4-dimethyl-5-cyclohexen-1-one, 2-butyryl-3,4-dimethyl-5-cyclohexen-1-one, 2-acetyl-3-butyl-4-ethyl-5-cyclohexen-1-one, 2-proprionyl-3,4,6-trimethyl-5-cyclohexen-1-one, 2-isobutyryl-4,6-diisopropyl - 5 - cyclohexen-1-one, 2-butyryl-3-isopropyl-4-methyl-6-ethyl-5-cyclohexen-1-one, 2-acetyl-3,3,4,6-tetraethyl-5-cyclohexen-1-one, and compounds homologous or analogous thereto.

It has been found that when a substantial excess of acrolein or a homolog thereof is caused to react with acetylacetone or a homologous beta-diketone in which the carbonyl carbon atoms are attached only to primary aliphatic carbon atoms, there may be prepared in advantageous yields alicyclic compounds containing two ketonic carbonyl groups and a formyl group, and which may be represented by the apparent formula

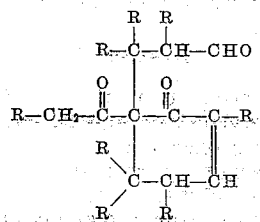

in which R represents either the hydrogen atom or a straight chain or branched chain alkyl group. An alternative method of preparing compounds within this group comprises reacting an alpha,beta-unsaturated aldehyde with a compound in the acetylcyclohexenone series of compounds containing the structural unit

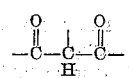

For example, 2-acetyl-2-(beta - propionaldehyde)-5-cyclohexene-1-one may be prepared by the reaction of acetylacetone with acrolein present in molar excess, as herein described. Alternatively, 2-acetyl-5-cyclohexen-1-one may be prepared in any suitable manner and treated with acrolein according to the hereindescribed process and in substantially equimolar proportions to obtain 2-acetyl-2-(beta-propionaldehyde)-5-cyclo-hexene-1-one in highly satisfactory yields. Other compounds according to the last given complete structural formula which may be prepared according to the process of the present invention include, among others, the following: 2-acetyl-2-(beta-isobutyraldehyde)-5-cyclohexen-1-one, 2-acetyl-2-(beta-propionaldehyde)-4,6-dimethyl-5-cyclohexen-1-one, 2-acetyl-2-(beta-propionaldehyde)-3,4,6-trimethyl-5-cyclohexen-1-one, 2-butyryl-2-(beta-butyraldehyde)-6-ethyl-5-cyclohexen-1-one, 2-propionyl-2-(beta-propionaldehyde)-3,3-dimethyl-6-ethyl-5-cyclohexen-1-one, and their homologs and their analogs.

It will be noted that in the process of the present invention, there apparently occurs an addition reaction wherein a carbon atom of the diketone is bonded via a carbon-to-carbon bond to the beta carbon atom of the unsaturated aldehyde. As a consequence, the process provides, in the absence of further reaction, keto-aldehydes wherein the formyl group is thought to correspond to the formyl group of the unsaturated aldehyde reactant. The keto-aldehydes thus obtained may be reduced to the corresponding keto-alcohols, as by treatment with hydrogen in the presence of an active metal hydrogenation catalyst such as Raney nickel, or they may be oxidized to the corresponding keto acids as by treatment with a suitable oxidizing agent. Both the keto-alcohols and the keto acids are useful, for example, in the preparation of esters and similar compositions of matter.

The following examples are presented for the purpose of illustrating certain of the possible specific embodiments of the present invention, and for the purpose of presenting characteristics of certain of the preferred compounds of the invention.

In the first example, there is illustrated one manner of executing the present process employing an alpha,beta-olefinically unsaturated aldehyde, specifically acrolein, and a beta-diketone, specifically acetylacetone, the reactants being present in substantially equimolar amounts, to obtain as products of the reaction compounds formed by the reaction of equimolar quantities of the reactants.

Example I

In this experiment, a mixture of 50 parts by weight of acetylacetone and 28 parts by weight of acrolein was placed in a reaction vessel, and 3 parts of pyridine were added to the mixture. The reaction mixture warmed spontaneously from room temperatures to about 40° C. in about five minutes. The reaction mixture was maintained at a temperature between about 25° C. and about 45° C. by means of cooling coils immersed therein, until the reaction was complete as judged by cessation of the evolution of heat. The reaction mixture then was distilled under reduced pressure into the following fractions:

A. 45° C. to 75° C. under 0.2 millimeter of mercury pressure; 12 parts.
B. 80° C. to 115° C. under 0.07 millimeter mercury pressure; 25.5 parts.
C. 127° C. to 152° C. under 0.05 millimeter mercury pressure; 21 parts.
D. Bottoms consisting of a light red, very viscous syrup; 15 parts.

Upon redistillation of fraction A, there were obtained 9 parts of a product determined to be 2-acetyl-5-cyclohexen-1-one, distilling at 64° C. to 68° C. under 1 millimeter mercury pressure and having a refractive index $(n_D^{20})$ of 1.4339 and a density $(d_4^{20})$ of 1.0935. Upon treatment with 2,4-dinitrophenylhydrazine it formed an orange crystalline derivative which melted at 156° C.

Upon redistillation of fraction B, there were obtained 21 parts of gamma,gamma-diacetylbutyraldehyde, a yellowish oil distilling at 88° C. to 92° C. under 0.04 millimeter mercury pressure and having a refractive index $(n_D^{20})$ of 1.4848. Its 2,4-dinitrophenylhydrazine derivative was prepared and was found to melt at 163° C. to 164° C. The gamma,gamma-diacetylbutyraldehyde could be converted by hydrogenation to 4,4-diacetylbutanol.

Redistillation of fraction C provided 16 parts of a yellow liquid distilling at 127° C. to 134° C. under 0.2 millimeter of mercury, having a refractive index $(n_D^{20})$ of 1.5153, and forming a 2,4-dinitrophenylhydrazine derivative which was insoluble in alcohol but which, upon recrystallization from chloroform, had a melting point of 238.5° C. to 239° C. The elemental analysis of this fraction indicated it to have an empirical formula of $C_{13}H_{18}O_4$, and hence to contain the carbon atoms of two molecules of acetylacetone and of one molecule of acrolein.

The preceding example illustrated the use in the present process of acrolein and acetylacetone present in substantially equimolar amounts, and products obtainable thereby. The following example illustrates the preparation of other products from the same reactants by use in the present process of a molar excess of acrolein over the acetylacetone.

Example II

A mixture of 100 parts by weight of acetylacetone and 168 parts of acrolein was placed in a reaction vessel and cooled to 0° C., and 0.5 part of pyridine was added. The mixture was allowed to warm gradually to room temperature and to stand at this temperature for two days. Upon distillation of the resultant mixture there was recovered, in addition to unreacted acrolein and a small amount of gamma,gamma-diacetylbutyraldehyde, 81 parts of distillate and 65 parts of undistilled material. The distillate was separated by further distillation into fractions having the following boiling ranges under 0.55 millimeter mercury pressure;

| | Parts |
|---|---|
| 1. 124° to 127° C | 24 |
| 2. 127° | 32 |
| 3. 127° to 135° C | 11 |

Each of the fractions crystallized upon standing at room temperatures. Recrystallization of each of the fractions from carbon tetrachloride and from absolute ethanol gave hard, white crystals which melted at 64.8° to 65.1° C. On the basis of its chemical and physical properties, the crystalline product was identified as having the probable structure

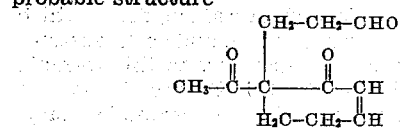

The following example illustrates the reaction of an unsaturated aldehyde, exemplified by acrolein, with a diketone containing the structural unit

comprising an alicyclic ring and having an organic group attached to the carbon atom between the two carbonyl carbon atoms.

*Example III*

A mixture of 12 parts of 2-acetyl-5-cyclohexen-1-one, 16 parts of acrolein, and 0.2 part of pyridine was heated under reflux for three hours and then allowed to stand at room temperature for 12 hours. Upon distillation of the resultant mixture, there was obtained 6 parts of a fraction distilling at 124° C. to 126° C. under 0.55 millimeter mercury pressure. Upon recrystallization from absolute ethanol, the product was obtained as a white crystalline material apparently identical with that prepared in the preceding example.

I claim as my invention:

1. As a new chemical compound, 2-acetyl-2-(beta-propionaldehyde)-5-cyclohexene-1-one.

2. As a new chemical compound, a compound having a structure represented by the structural formula

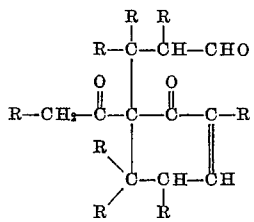

in which each R signifies one of the group consisting of the hydrogen atom and the alkyl radicals.

3. Process which consists in mixing acrolein and acetylacetone, in a molar proportion from about 2 to about 10 moles of the former per mole of the latter, and condensing in liquid phase said acrolein with said acetylacetone while maintaining a reaction temperature from about 10° C. to about 100° C., to produce 2-acetyl-2-(beta-propionaldehyde)-5-cyclohexene-1-one as a principal product of the reaction.

4. Process according to claim 3 when the reaction is catalyzed by the presence in the reaction mixture of a catalyst for the reaction.

5. Process according to claim 4 when the catalyst is pyridine.

6. Process which consists in mixing acrolein and acetylacetone and an inert organic solvent, said reactants being present in an initial molar proportion from about 2 to about 10 moles of the acrolein per mole of the acetylacetone, and condensing said acrolein with said acetylacetone while maintaining a reaction temperature from about 0° C. to about 100° C., to produce 2-acetyl-2-(beta-propionaldehyde)-5-cyclohexene-1-one as a principal product of the reaction.

7. Process according to claim 6 when the reaction is catalyzed by the presence in the reaction mixture of a catalyst for the reaction.

8. Process of producing at least one of gamma,gamma-diacetylbutyraldehyde, 2-acetyl-5-cyclohexene-1-one, and 2-acetyl-2-(beta-propionaldehyde)-5-cyclohexene-1-one which consists in mixing acrolein and acetylacetone in the liquid state, said reactants being present in an initial molar ratio from about 20:1 to about 1:2, and effecting reaction therebetween at a temperature from about 0° C. to about 100° C.

9. Process for the production of at least one of a monomeric acyl-substituted aldehyde and ketone which consists in mixing acrolein with an aliphatic diketone having two ketonic carbonyl groups directly linked to a single carbon atom and having two hydrogen atoms directly bonded to said carbon atom in an initial molar ratio of the aldehyde to the ketone of from about 20:1 to about 1:2, and condensing the acrolein with said diketone in the resulting liquid phase at a temperature between about 0° C. and about 100° C. whereby there is produced the acylated compound via addition reaction wherein said carbon atom of said diketone is bonded via carbon-to-carbon bonding to the beta carbon atom of acrolein.

10. Process according to claim 9 when the reaction is catalyzed by the presence in the reaction mixture of a catalyst for the reaction.

11. Process which comprises interacting as the sole reactants acrolein and 2-acetyl-5-cyclohexene-1-one, said reactants being present in an initial molar proportion from about 2 to about 10 moles of the former per mole of the latter, while maintaining a reaction temperature from about 10° C. to about 50° C., to produce 2-acetyl-2 - (beta-propionaldehyde)-5-cyclohexene-1-one as a principal product of the reaction.

12. Process of producing at least one of a monomeric acyl-substituted aldehyde and ketone which consists in mixing a lower aliphatic alpha,beta-olefinic aldehyde and an aliphatic diketone having two ketonic carbonyl groups directly linked to a single carbon atom and having hydrogen directly bonded to said carbon atom in an initial molar ratio of the aldehyde to the ketone of from about 20:1 to 1:2, and condensing in the resulting liquid phase said alpha,beta-olefinic aldehyde with said diketone at a temperature from about 0° C. to about 100° C. whereby there is produced the acylated compound via addition reaction wherein said carbon atom of said diketone is bonded via carbon-to-carbon bonding to the beta carbon atom of said olefinic aldehyde.

13. Process according to claim 12 when executed in the presence of a catalyst for the reaction.

CURTIS W. SMITH.

REFERENCES CITED

The following references are of record in the file of this patent:

UNITED STATES PATENTS

| Number | Name | Date |
| --- | --- | --- |
| 2,088,017 | Wickert et al. | July 27, 1937 |
| 2,239,232 | Huyser | Apr. 22, 1941 |
| 2,363,829 | Caplan et al. | Nov. 28, 1944 |
| 2,388,086 | Rust | Oct. 30, 1945 |
| 2,447,626 | Bahner | Aug. 24, 1948 |

FOREIGN PATENTS

| Number | Country | Date |
| --- | --- | --- |
| 106,619 | Sweden | Feb. 23, 1943 |

OTHER REFERENCES

Dilthey et al.: Chemical Abstracts, vol. 26, 2974 (1932).

Beilstein's Handbuch der Organishen Chemie, vol. 7, page 581 (1925); vol. 7, first supplement, page 333 (1931) Berlin.